Feb. 6, 1962 T. P. JONES 3,019,883
CODING MECHANISM FOR CONVEYOR SYSTEMS
Filed May 6, 1959 3 Sheets-Sheet 1

INVENTOR
THOMAS P. JONES
BY
John E. Thupeer
ATTORNEY

Feb. 6, 1962 T. P. JONES 3,019,883
CODING MECHANISM FOR CONVEYOR SYSTEMS
Filed May 6, 1959 3 Sheets-Sheet 2
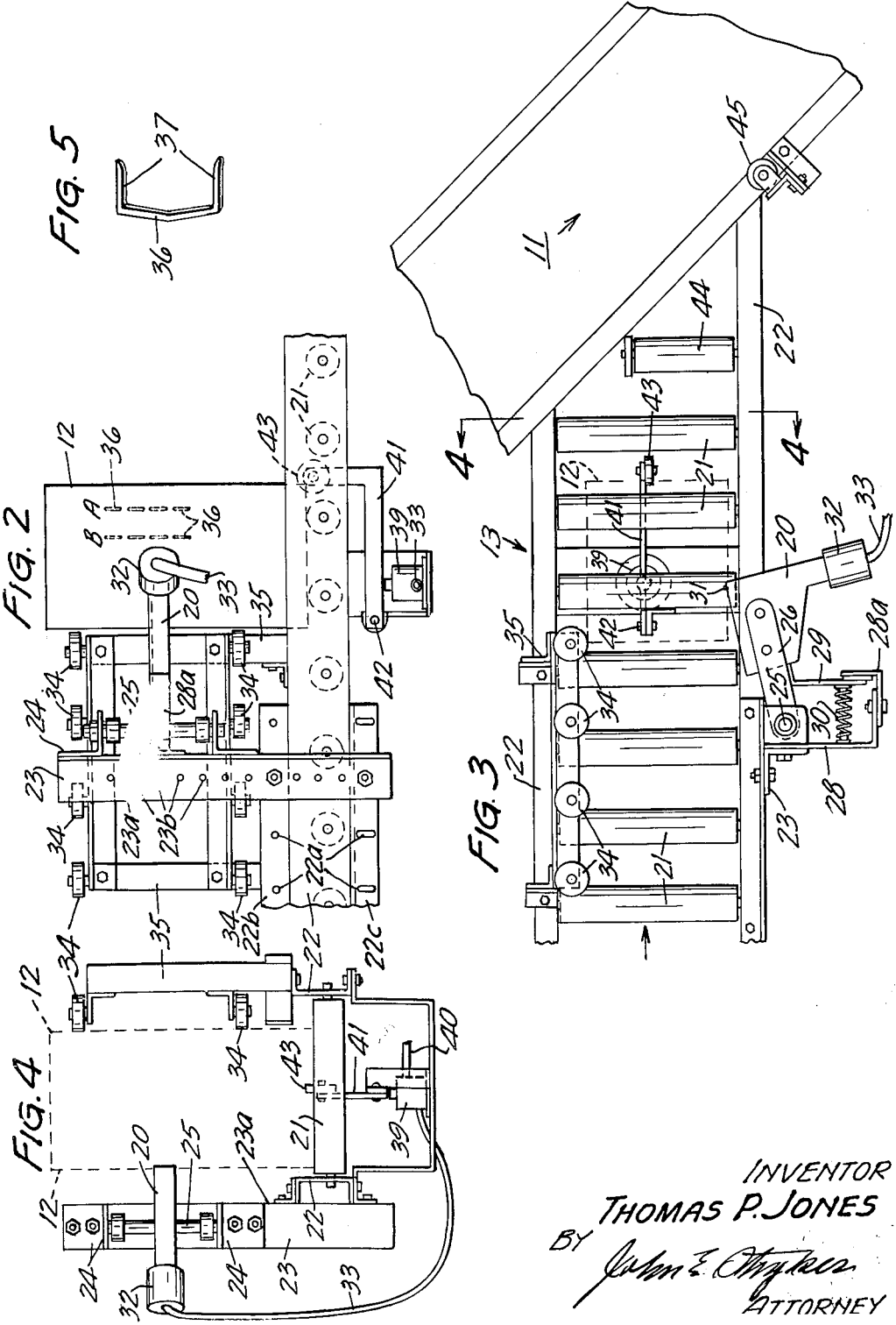
INVENTOR
THOMAS P. JONES
BY John E. Hughes
ATTORNEY Feb. 6, 1962 T. P. JONES 3,019,883
CODING MECHANISM FOR CONVEYOR SYSTEMS
Filed May 6, 1959 3 Sheets-Sheet 3
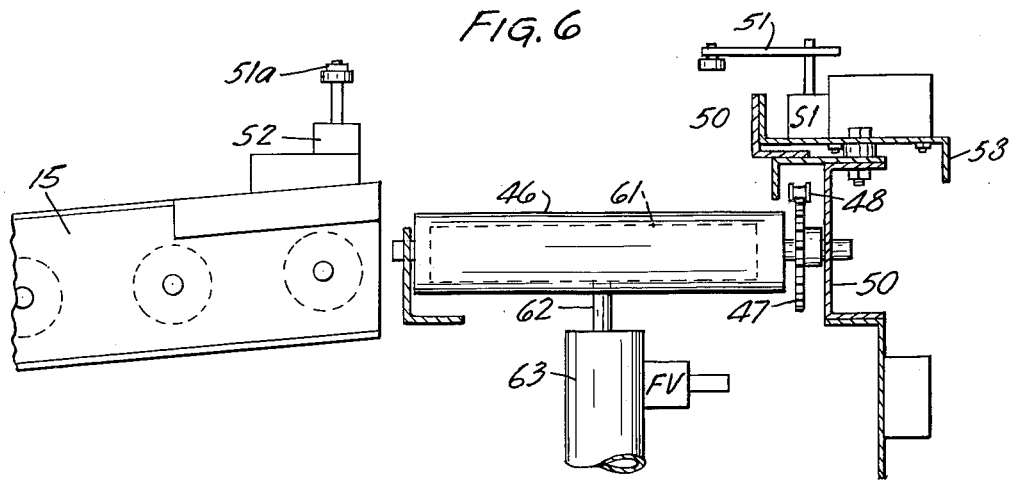
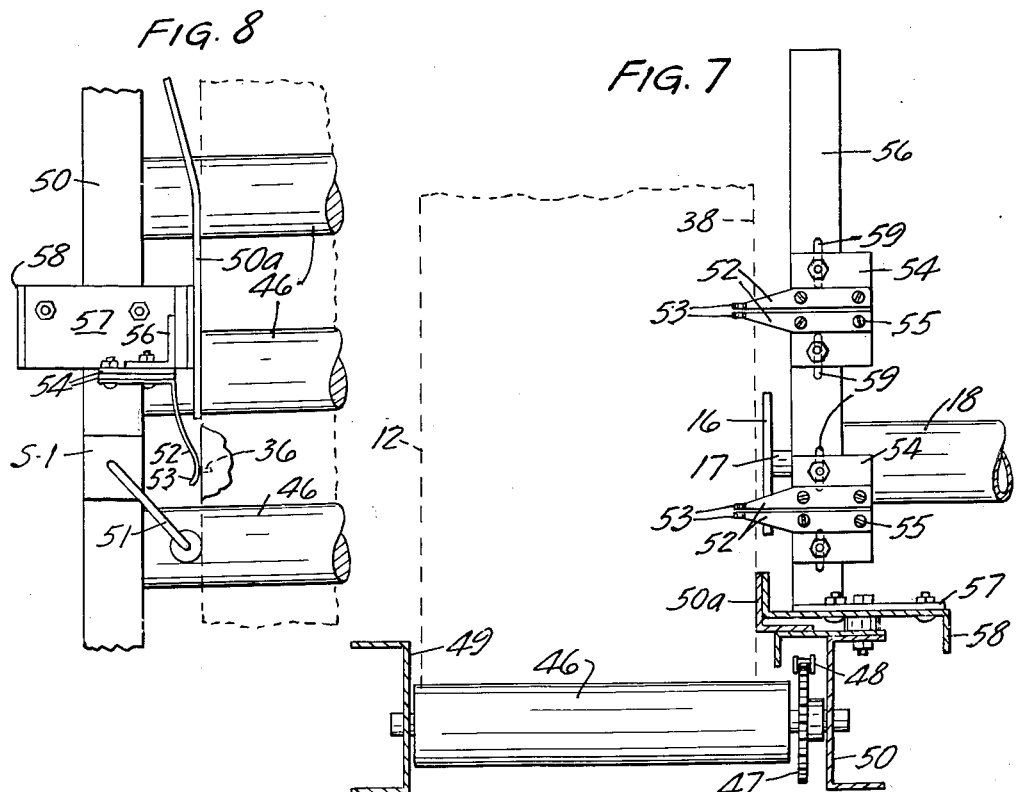
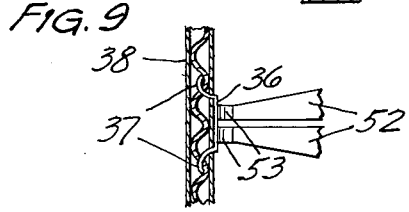
INVENTOR
THOMAS P. JONES
BY John E. Stryker
ATTORNEY United States Patent Office 3,019,883
Patented Feb. 6, 1962

3,019,883
CODING MECHANISM FOR CONVEYOR SYSTEMS
Thomas P. Jones, St. Paul, Minn., assignor to Standard Conveyor Company, North St. Paul, Minn., a corporation of Minnesota
Filed May 6, 1959, Ser. No. 811,461
7 Claims. (Cl. 198—38)

This invention relates to conveyor systems having improved electric control means for automatically determining the course or destination of load units carried by the conveyor.

It is an object of my invention to provide in a conveyor system of the class described novel electric code elements comprising staples adapted to be affixed to load units or containers in selected code positions whereby a control circuit may be completed when one or more of the staples are contacted by electrically connected feeler elements associated with transfer stations or branch conveyors spaced along a main conveyor.

A further object is to provide a novel mounting for staple affixing mechanism associated with a loading station or control point whereby staples may be affixed in accurately located, preselected code positions on the load units.

Another object is to provide, in a conveyor system of the class described, at each of a plurality of transfer stations or branch conveyors, transfer mechanism adapted to remove load units from the main conveyor and means for activating the transfer mechanism upon the closing of a circuit which includes a pair of sensing fingers formed and disposed to make contact simultaneously with a staple in a code position on a load unit identifying a preselected transfer station or branch conveyor.

My invention also includes certain other novel features of construction which will be described and particularly pointed out in the following specification and claims.

Referring to the accompanying drawings which illustrate, by way of example and not for the purpose of limitation, one embodiment of my improved coding mechanism:

FIG. 2 is a side elevational view of mechanism for applying coding staples at a loading station;

FIG. 3 is a plan view of the same together with an adjoining portion of the main conveyor;

FIG. 4 is a vertical cross sectional view taken on the line 4—4 of FIG. 3;

FIG. 5 is a perspective view showing one of the staples before affixation to a load unit;

FIG. 6 is a fragmentary cross sectional view through the main conveyor, taken on the line 6—6 of FIG. 1, showing a portion of one of the transfer stations with associated detectors and limit switches;

FIG. 7 is a cross sectional view through the main conveyor, taken on the line 7—7 of FIG. 1, showing two pairs of detector fingers and the supporting post for a transfer station;

FIG. 8 is a plan view showing a pair of detector fingers and the support therefor;

FIG. 9 is a diagrammatic fragmentary sectional view taken through a wall of a load unit or container with a staple affixed thereto and in circuit closing relation to the tip of a pair of detector fingers.

Figure 1:
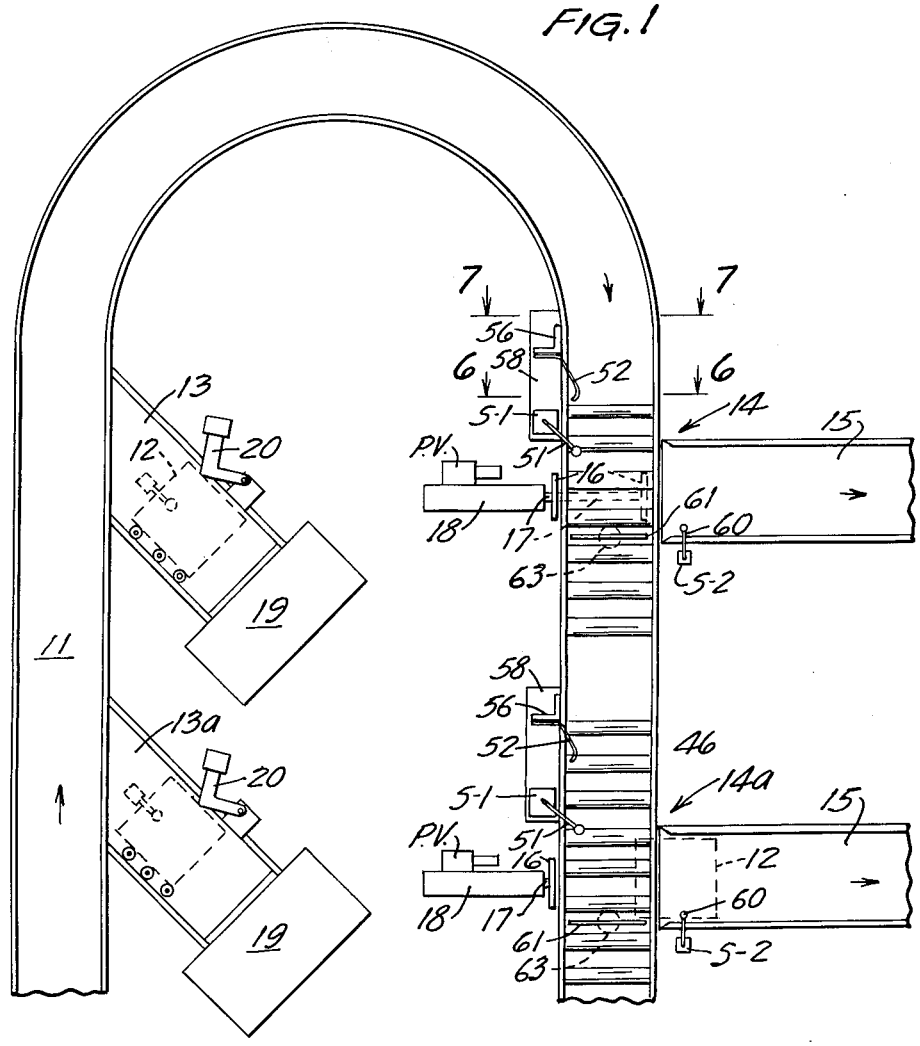
FIGURE 1 is a diagrammatic view showing a conveyor system having my improved coding mechanism associated with a plurality of loading and transfer stations.

The conveyor system shown diagrammatically in FIG. 1 comprises a main conveyor 11 adapted to receive containers or load units 12 from a plurality of loading stations 13, 13a, spaced along the path of travel defined by the main conveyor. Also spaced along the main conveyor are transfer stations indicated generally by the numerals 14 and 14a each of which is provided with mechanism for transferring selected load units from the main conveyor to a branch conveyor 15. As illustrated, the transfer mechanism at each station comprises a pusher head 16 adapted to be actuated by fluid pressure responsive means including a piston actuated rod 17 adapted to be extended from a cylinder 18 under control of a pusher valve PV. This valve is preferably solenoid actuated so that it may be activated electrically to operate the pusher head 16. Transfer mechanism of any of a number of other conventional or suitable types may be substituted for the pushers 16.

As further indicated in FIG. 1, the load units 12 may be assembled on work benches 19 positioned adjacent to each of the load stations 13, 13a. As used herein the term "load units" is intended to include cartons, boxes and other containers of articles, commodities or supplies to be transported by the conveyor system.

*Code staple affixing, mechanism*

Details of one embodiment of my improved means for applying code staples to the load units are shown in FIGS. 2–4. This mechanism includes a stapling gun 20 mounted adjacent to the path of movement of load units at a loading station and adapted to affix a staple in a preselected code position on each of the load units. The stapling gun 20 may be of any suitable or conventional type and is preferably pneumatically operated under controls which are activated by the movement of the load units from the loading station toward the main conveyor. Stapling gun 20 is pivotally supported to oscillate in a horizontal plane and is biased toward side walls of successive load units moving on the loading station platform. This platform is preferably provided with freely rotating load supporting rollers 21 mounted between side rails 22.

Rising vertically from one of the side rails 22 is a post 23 adapted to be secured in selected positions along the rail. A pair of angle brackets 24 are secured in selected positions along the post 23 and project horizontally in parallel relation one to the other from the post 23. A vertical shaft 25 extends between the angle brackets 24 to afford a pivotal support for the staple gun 20. The latter is secured to the pivot shaft 25 by clamp member 26. A shown in FIG. 3, another angle bracket 28 is fixed on the post 23 at the elevation of the gun 20 and has an L-shaped extension 28a which affords a stop for an arm 29 projecting from the gun 20. A compression spring 30 is confined between the bracket 28 and arm 29 to bias the gun 20 toward the path of the load units, the arm 29 being rigidly connected to the clamp members 26. Staples are projected from the gun 20 through a small slot indicated at the point 31 in FIG. 3. Compressed air for actuating the gun is supplied to an air cylinder 32 having a flexible tube 33 extending to a pneumatic valve, as hereinafter described.

Guide rollers 34 are mounted at the side of the loading platform opposite the staple gun 20 for accurately positioning the load units as they are moved toward the gun along the loading platform. Two vertically spaced rows of the rollers 34 are mounted on brackets supported on posts 35, as indicated in FIGS. 2 and 4. As illustrated, the load units have plane vertically disposed opposite side walls and the rollers 34 make contact with the load units in a plane which is perpendicular to the platform or load supporting rollers 21.

Each of the load units has a wall of electro-non-conducting material into which the staples are driven. Examples of suitable material are wood, ordinary fiberboard and corrugated boxboard into which the staples may be driven. The staples may be of the common type in wide use in building construction, being formed from metal wire in the shape indicated in FIG. 5. Thus the staples may be approximately U-shaped, having an elongated portion 36 on the order of ½ inch in length adapted to extend vertically upon the exterior surface of a load unit and end portions 37 adapted to penetrate and to be clinched in engagement with the wall of a load unit. In FIG. 9 a staple is shown affixed to a wall 38 of a load unit with the end portions 37 of the staple outwardly clinched and the elongated portion 36 extending upon the exterior surface of the wall member. An example of a suitable stapling gun is "Bostitch-McClain" T5-6 ADOC, Stapling Tacker, series 4, outwardly clinching type.

Operation of the stapling gun is under control of an air valve 39 adapted to be supplied with air under pressure through a supply tube 40 and adapted to discharge the air through the flexible tube 33 extending to the stapling gun cylinder 32. Mechanism for operating the valve 39 in response to movement of the load units 12 along the loading station may comprise a lever 41 pivotally supported at 42 and carrying a roller 43 at its front end for engagement with the load units. This roller is supported on a vertical extension of the lever 41 and is adapted to project slightly above the upper peripheries of the platform rollers 21 for contact with the load units. The roller 43 is preferably disposed to make contact with the lower leading corner and bottom surface of a load unit so that the lever 41 is depressed to actuate the valve 39 and thereby activate the stapling gun 20 to drive a staple into the side of the load unit instantaneously when the roller 43 is depressed. The valve 39 is of the quick dumping type adapted to deliver a measured volume of air for each operation of the stapling gun.

Provision is made for affixing the staples in a multiplicity of different code positions on the walls of the load units. In the system illustrated the several loading stations 13, 13a, etc. are provided with staple guns located in different code positions and the gun supporting posts 23 are interchangeable between the several stations. Thus a vertical flange 23a of the post 23 (FIGS. 2 and 4) has drill holes 23b at regularly spaced intervals corresponding in number to the number of vertically spaced code positions required for a particular conveyor system. Bolts are used in selected holes 23b for securing the post 23 at suitable elevations relative to the supporting side rail 22 of the loading station. In a system where the number of code positions required exceeds the number of positions possible in a single vertical row, a larger number of code positions may be provided in zones spaced apart horizontally. This is indicated in FIG. 2 by zones A and B each comprising four vertically spaced staple positions. To affix staples in such zones the post 23 may be mounted in selected positions along the supporting rail 22 in relation to the position of the valve actuating roller 21. Thus rows of bolt holes 22a may be provided in supporting rail members 22b and 22c at the required zone positions for the post 23.

Two or more staple affixing guns may be associated with any of the loading stations to provide a large number of different combinations of code positions adapted to be "read" by sensing mechanism located at the several transfer stations or branch conveyors, as hereinafter described. As shown in FIG. 3, at the junction of the loading station 13 with the main conveyor 11 turn rollers 44 and 45 are provided to facilitate the feeding of the load units to the main conveyor 11 after they have received the code staples. The main conveyor may comprise combinations of power-driven belt sections and live roller sections, or combinations of gravity sections and any suitable type of other power-actuated conveyor sections.

*Sensing and transfer mechanism*

Load units carrying the code staples from the several loading stations 13, 13a, etc. may be intermixed in any random pattern wherein the successive units 12 on the main conveyor 11 may be from any of the loading stations. Such units are moved along the path defined by the main conveyor to the several transfer stations indicated at 14, 14a, etc. As they approach the first transfer station the load units are separated one from another along the main conveyor by suitable means such as relatively high speed conveyor sections which increase the velocity of the individual load units successively in a conventional or suitable manner.

As shown in FIGS. 6, 7 and 8, I provide at each transfer station a section of live rollers 46 each of which is provided with a sprocket wheel 47 adapted to be rotated by a power-actuated driving chain 48. The load units are guided between side rail members 49 and 50 at each transfer station and may be maintained in sliding contact with the member 50 by skewing the rollers 46 at a small angle to the direction of travel, as indicated in FIG. 8. As each load unit approaches a transfer station its side wall 38 contacts a pair of sensing fingers 52 and its leading end then actuates a switch arm 51 which is operatively connected to a limit switch S-1 to close its normally open contacts. This switch has normally open and normally closed contacts included in control circuits, as hereinafter described.

Sensing fingers 52 are constructed from flexible and resilient electro-conducting material, e.g., bronze or brass, adapted to make electrical contact with a code staple in a predetermined code position for activating transfer mechanism at a station for which the load unit is destined. Narrow vertically spaced tips 53 are formed on the sensing fingers 52 to make simultaneous sliding contact with the side walls 38 of load units. A reader circuit is completed when an elongated portion 36 of a staple connects the fingers 52, as indicated in FIG. 9. Each pair of sensing fingers 52 is secured to laminated insulating members 54 and a terminal connector 55 for a wire is provided for each finger. The finger assembly including the members 54 are secured to a post 56 which is integral with a base plate 57. This plate is secured to a reader assembly mounting plate 58 which extends along the main conveyor side rail and is secured thereto to support limit switch S-1 as well as the post 56 carrying the sensing fingers 52. A series of vertically elongated slots 59 are formed in the post 56 to receive bolts for securing one or more of the sensing finger assemblies at selected, precisely located elevations on the post.

Limit switch S-1 is so located in relation to a branch conveyor 15 as to condition a "reader" circuit including a pair of the sensing fingers 52 so that the transfer mechanism is activated when the fingers 52 are connected electrically by a code staple carried by a load unit.

A second limit switch S-2 is mounted near the receiving end of each of the branch conveyors 15 and has an actuating arm 60 projecting into the path of the load units. Switch 52 has normally closed contacts included in the reader circuit for deactivating the transfer mechanism upon the completion of each transfer operation.

To stop load units destined for a particular branch conveyor in position for transfer to the branch conveyor, I provide a vertically movable fence 61 adapted to project between and above the rollers 46 at the required aligning position. The fence 61 at each station is connected to a piston actuated rod 62 projecting from a vertically disposed cylinder 63 (FIG. 6). Fluid under pressure, preferably air, is supplied to the cylinder 63 through a solenoid actuated valve FV.

Figure 10:
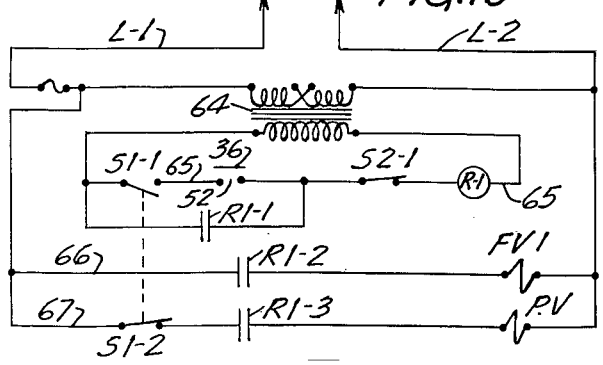
FIG. 10 is a wiring diagram showing a suitable arrangement of circuits for one of the transfer stations.

Suitable control circuits are shown in FIG. 10. These circuits are supplied with current from line conductors L-1 and L-2. Current of suitably low voltage from the secondary windings of a transformer 64 is supplied to a reader circuit 65 which includes normally open contacts S1-1 of the limit switch S-1, a pair of the sensing fingers 52, contacts S2-1 of the limit switch S2 and the coil of a relay R-1. This relay has three sets of contacts indicated respectively at R1-1, R1-2 and R1-3 in the circuit diagram. R1-1 are normally open holding contacts for the relay. Normally open contacts R1-2 control a circuit 66 including the coil of solenoid FV-1 for actuating the fence valve FV, and contacts R1-3 control a circuit 67 which includes solenoid PV-1 of pusher valve PV, and normally closed contacts S1-2 of switch S-1.

In operation, a load unit approaching a transfer station is contacted first by a pair of fingers 52 and then by a switch arm 51 of a switch S-1. Staples in code positions on the several load units are spaced a sufficient distance back from the front faces of the load units so that the switch S-1 is actuated to condition the reading circuit prior to the closing of the circuit at the sensing finger 52. Thus circuit 65 is conditioned for activation upon the closing of the normally open contacts S1-1 of switch S-1 and this circuit is completed only when the sensing fingers 52 are connected electrically by a staple having an exposed portion 36 in the correct code position for the adjacent transfer station. Relay R-1 is energized upon the closing of reader circuit 65, causing holding contacts R1-1 to hold the relay in, while contacts R1-2 close fence circuit 66 and contacts R1-3 condition pusher circuit 67 for activation upon the closing of contacts S1-2 which are held open until the load unit releases the switch arm 51.

Activation of fence circuit 66 energizes solenoid FV-1 to cause the fence 62 to be raised to its elevated position where it stops the load unit in alignment with the adjacent branch conveyor 15. As the load unit is stopped by the fence 62, switch arm 51 is released by the load unit and switch S-1 returns to its normal position, thereby opening contacts S1-1 and closing contacts S1-2. Closing of the latter contacts causes pusher circuit 67 to be activated, energizing pusher valve solenoid PV-1 which admits fluid under pressure to pusher cylinder 18. Pusher head 16 is thereby actuated to transfer the load unit to branch conveyor 15. In moving to the branch conveyor the load unit actuates switch arm 60 to open normally closed contacts S2-1 and deactivate reader circuit 65 and deenergize relay R-1. Finally, when the load unit releases switch arm 60, contacts S2-1 are returned to their closed position and the control circuits are restored to the condition indicated in FIG. 10.

All load units destined for removal from the main conveyor at stations beyond the first transfer station 14 are carried to such other station as may be selected by the staple or staples affixed in code positions on the load units. Thus, each pair of sensing fingers are so located as to co-act with a staple in a corresponding position or zone on load units destined for one of the several transfer stations.

The staple coding and reading controls of the present invention are adapted for many uses in addition to that specifically described in the foregoing specification. For example, the signal obtained from the reading circuit may be used for counting, identifying, signaling or energizing other components in the handling and transportation of materials, articles and other units adapted to receive and carry staples in various code positions.

My coding and reading apparatus has a number of advantages over other known systems of this class. The staples and stapling guns constitute relatively inexpensive, simple and reliable coding means which are adapted to be mounted by simple means in operative relation to the units to receive the staples. Such guns are adapted to be actuated automatically to affix the staples in predetermined, accurately located code positions on the load units and require only relatively simple support and control elements for trouble-free operation. My code sensing means comprising pairs of probe fingers included in the several reading circuits, with each pair disposed to activate a selected circuit when the fingers in that circuit are connected by a staple in a code position, are also simple, reliable and inexpensive.

I claim:

1. In a conveyor system having a conveyor adapted to convey load units along a determined path to a plurality of stations, each of said units having an outer wall member of electro-non-conducting material, a stapling gun disposed to affix a coding staple to said wall member in a predetermined code position, means for actuating said gun to affix a staple to a load unit in a code position which is associated with one of said stations, said staple having an elongated exposed conductor portion adapted to be contacted simultaneously by sensing fingers associated with a selected station.

2. A conveyor system in accordance with claim 1 in which said stapling gun is associated with a loading station platform from which load units may be fed to said conveyor.

3. A conveyor system in accordance with claim 2 in which said means for actuating said gun are power-actuated and include a control member disposed to be actuated by a load unit at said loading station platform for actuating said gun to affix a staple in a predetermined position on successive load units on said platform.

4. A conveyor system in accordance with claim 2 including a vertically elongated support for said gun and means for securing said gun to said support at selected elevations above said platform.

5. A conveyor system in accordance with claim 1 in which said stapling gun is associated with a loading station from which load units may be fed to said conveyor, and said means for actuating said gun comprises fluid pressure responsive means, a valve for controlling the flow of fluid to said fluid pressure responsive means and an actuating member for said valve engageable with load units when in a predetermined position at said loading station for activating said stapling machine to affix staples to load units so positioned.

6. In a conveyor system having a main conveyor adapted to convey load units along a determined path from a plurality of loading station platforms to a plurality of transfer stations, each of said units having an outer wall member of electro-non-conducting material and each of said platforms including a feed conveyor for said main conveyor, a stapling gun associated with each of said platforms to affix coding staples to such walls of the load units on the associated platform, each of said stapling guns being mounted adjacent to the path of movement of load units on the associated feed conveyor and in various code positions each associated with one of said transfer stations, power means for actuating said guns at the several loading stations to affix staples to load units thereon, each of said staples having an elongated exposed conductor portion adapted to be contacted simultaneously by sensing fingers associated with one of said transfer stations, and means projecting in the path of movement of the load units on each feed conveyor for activating the stapling gun associated with such feed conveyor to affix staples to the load units when they arrive at predetermined positions on the several feed conveyors.

7. A conveyor system in accordance with claim 6 including means pivotally supporting the several stapling guns for oscillating movement in a horizontal plane, and means biasing each of said guns toward the side walls of the load units moving along the several feed conveyors.

References Cited in the file of this patent

UNITED STATES PATENTS

| | | |
|---|---|---|
| 1,904,837 | Posey | Apr. 18, 1933 |
| 2,063,230 | Crady | Dec. 8, 1936 |
| 2,728,466 | Postlewaite | Dec. 27, 1955 |
| 2,794,535 | Hauschild | June 4, 1957 |